United States Patent
Takahashi et al.

(10) Patent No.: US 12,341,879 B2
(45) Date of Patent: Jun. 24, 2025

(54) KEY MANAGEMENT DEVICE, QUANTUM CRYPTOGRAPHY COMMUNICATION SYSTEM, AND COMPUTER PROGRAM PRODUCT

(71) Applicant: KABUSHIKI KAISHA TOSHIBA, Tokyo (JP)

(72) Inventors: Ririka Takahashi, Setagaya Tokyo (JP); Yoshimichi Tanizawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 187 days.

(21) Appl. No.: 17/821,281

(22) Filed: Aug. 22, 2022

(65) Prior Publication Data
US 2023/0308264 A1    Sep. 28, 2023

(30) Foreign Application Priority Data
Mar. 22, 2022 (JP) .................................. 2022-045276

(51) Int. Cl.
H04L 9/08 (2006.01)
(52) U.S. Cl.
CPC .......... *H04L 9/0852* (2013.01); *H04L 9/0819* (2013.01); *H04L 9/085* (2013.01); *H04L 9/0869* (2013.01)
(58) Field of Classification Search
CPC ..... H04L 9/0852; H04L 9/0819; H04L 9/085; H04L 9/0869
USPC ........................................................ 380/278
See application file for complete search history.

(56) References Cited

U.S. PATENT DOCUMENTS

| | | | |
|---|---|---|---|
| 9,755,828 B2 | 9/2017 | Tanizawa | |
| 10,708,046 B1* | 7/2020 | Ashrafi | H04L 9/0852 |
| 2006/0062392 A1* | 3/2006 | Lee | H04L 9/0852 |
| | | | 380/278 |
| 2014/0089663 A1 | 3/2014 | Tanizawa et al. | |

(Continued)

FOREIGN PATENT DOCUMENTS

| | | |
|---|---|---|
| JP | 2014-68313 A | 4/2014 |
| JP | 2015-179974 A | 10/2015 |

(Continued)

OTHER PUBLICATIONS

ETSI, Group Specification ETSI GS QKD 014 V1.1.1, "Quantum Key Distribution(QKD); Protocol and data format of REST-based key delivery API," 22 pages (2019).

(Continued)

*Primary Examiner* — Liang Che A Wang
(74) *Attorney, Agent, or Firm* — Finnegan, Henderson, Farabow, Garrett & Dunner LLP

(57) ABSTRACT

A key management device according to an embodiment includes one or more hardware processors configured to function as a determination unit, a generation unit, and a supply unit. The determination unit determines a type of request data requested by a request message transmitted from an application that performs encrypted data communication. The generation unit generates a response message including at least one of a random number and an encryption key shared by quantum key distribution (QKD) via a communication network according to a type of the request data. The supply unit supplies the response message to the application.

10 Claims, 21 Drawing Sheets

(56) References Cited

U.S. PATENT DOCUMENTS

| | | | |
|---|---|---|---|
| 2015/0270963 | A1 | 9/2015 | Tanizawa |
| 2019/0074961 | A1 | 3/2019 | Tanizawa |
| 2021/0328784 | A1 | 10/2021 | Doi et al. |
| 2022/0006627 | A1* | 1/2022 | Ko ....................... H04L 9/0852 |

FOREIGN PATENT DOCUMENTS

| | | |
|---|---|---|
| JP | 2016-171530 A | 9/2016 |
| JP | 2019-50453 A | 3/2019 |
| JP | 2021-170742 A | 10/2021 |
| WO | WO-2020260751 A1 * | 12/2020 |

OTHER PUBLICATIONS

Japan Patent Office, Office Action in JP App. No. 2022-045276, 2 pages, and machine translation, 3 pages (Nov. 26, 2024).

* cited by examiner

FIG.5

| | | HTTP Method | GET | |
|---|---|---|---|---|
| 1 | Get Status API | url | /{APPLICATION NAME}/status | |
| | | Input | | |
| | | Output | JSON FORMAT CONSISTING OF STATUS DATA | |
| 2 | Get key API (FOR MASTER) | HTTP Method | GET | |
| | | url | /{APPLICATION NAME}/enc_keys | |
| | | Input | NUMBER OF KEYS | |
| | | Output | JSON FORMAT CONSISTING OF KEY DATA AND ID (SEE FIG. 6) | |
| 3 | Get key with key IDs API (FOR SLAVE) | HTTP Method | POST | |
| | | url | /{APPLICATION NAME}/dec_keys | |
| | | Input | KEY ID DATA | |
| | | Output | JSON FORMAT CONSISTING OF KEY DATA AND ID (SEE FIG. 6) | |

```
{"keys": [
  {"key ID": 1000010, "key": "XXXXXXXXXXXXXXXX"},
  {"key ID": 1000011, "key": "XXXXXXXXXXXXXXXX"},
  {"key ID": 1000012, "key": "XXXXXXXXXXXXXXXX"},
  {"key ID": 1000013, "key": "XXXXXXXXXXXXXXXX"},
  {"key ID": 1000014, "key": "XXXXXXXXXXXXXXXX"}
]
}
```

FIG.9

| ITEM NUMBER | API CALL (REQUEST) | API RESPONSE (RESPONSE) |
|---|---|---|
| 1 | REQUEST FOR ENCRYPTION KEY | RESPONSE OF ENCRYPTION KEY |
| 2 | REQUEST FOR ENCRYPTION KEY | RESPONSE OF ENCRYPTION KEY + RANDOM NUMBER |
| 3 | REQUEST FOR RANDOM NUMBER | RESPONSE OF RANDOM NUMBER |
| 4 | REQUEST FOR RANDOM NUMBER | RESPONSE OF ENCRYPTION KEY + RANDOM NUMBER |
| 5 | REQUEST FOR ENCRYPTION KEY + RANDOM NUMBER | RESPONSE OF ENCRYPTION KEY + RANDOM NUMBER |
| 6 | DESIGNATION OF COMMUNICATION METHOD AND/OR COMMUNICATION DESTINATION | RESPONSE OF ENCRYPTION KEY + RANDOM NUMBER |

FIG.10A

```
POST https://{KME_hostname}/api/v1/keys/rng
{
"type": rng, "number": 3, "size": 1024
}
```

FIG.10B

```
POST https://{KME_hostname}/api/v1/keys/(SAE_ID)/enc_keys
{
"requests" [
{"type": rng, "number": 3, "size": 1024},
{"type": key, "number": 10, "size": 256}
]
}
```

FIG.10C

```
POST https://{KME_hostname}/api/v1/keys/(SAE_ID)/enc_keys
{
"requests" [
{"type": key, "number": 10, "size": 256},
{"type": rng}
]
}
```

FIG.10D

```
POST https://{KME_hostname}/api/v1/keys/(SAE_ID)/enc_keys
{
"type: default AES"
}
```

FIG. 11A

```
{"mgs":[
{"mg_ID": "bc490419-7d60-487f-adc1-4ddcc177c139", "mg": "AAAAAAAAAAAAAAA"},
{"mg_ID": "0a782fb5-3434-48fe-aa4d-14f41d46cf92", "mg": "BBBBBBBBBBBBBBB"},
{"mg_ID": "64a7e9a2-269c-4b2c-832c-5351f3ac5adb", "mg": "CCCCCCCCCCCCCCC"}
]}
```

FIG.11B

```
{"mgs":[
{"mg_ID": "bc490419-7d60-487f-adc1-4ddcc177c139", "mg": "AAAAAAAAAAAAAA"},
{"mg_ID": "0a782fb5-3434-48fe-aa4d-14f41d46cf92", "mg": "BBBBBBBBBBBBBB"},
{"mg_ID": "64a7e9a2-269c-4b2c-832c-5351f3ac5adb", "mg": "CCCCCCCCCCCCCC"}
],
"keys":[
{"key_ID": "99bb07ee-3cd6-be7d-653b-1d10fe817868", "key": "DDDDDDDDDDDDDD"},
{"key_ID": "c0a4972e-62e2-e1a9-8759-ffea9384a19e", "key": "EEEEEEEEEEEEEE"},
{"key_ID": "ca8b406a-c4eb-79f7-3399-278add3feecc", "key": "FFFFFFFFFFFFFF"}
]}
```

FIG.11C

```
{"keys": [
{"key_ID": "99bb07ee-3cd6-be7d-653b-1d10fe817868",
"key": "DDDDDDDDDDDD",
"rng": "AAAAAAAAAA"},
{"key_ID": "c0a4972e-62e2-e1a9-8759-ffea9384a19e",
"key": "EEEEEEEEEEEE",
"rng": "BBBBBBBBBB"},
{"key_ID": "ca8b406a-c4eb-79f7-3399-278add3feecc",
"key": "FFFFFFFFFFFF",
"rng": "CCCCCCCCCC"},
......]
}
```

KEY MANAGEMENT DEVICE, QUANTUM CRYPTOGRAPHY COMMUNICATION SYSTEM, AND COMPUTER PROGRAM PRODUCT

CROSS-REFERENCE TO RELATED APPLICATIONS

This application is based upon and claims the benefit of priority from Japanese Patent Application No. 2022-045276, filed on Mar. 22, 2022; the entire contents of which are incorporated herein by reference.

FIELD

Embodiments described herein relate generally to a key management device, a quantum cryptography communication system, and a computer program product.

BACKGROUND

The quantum key distribution (QKD) technology for securely sharing an encryption key by utilizing a single photon continuously transmitted between a transmission node and a reception node connected by an optical fiber is conventionally known. It is ensured that the encryption key shared by the quantum key distribution technology is not eavesdropped based on the principle of quantum mechanics. In addition, it is guaranteed by information theory that encrypted data communication by a one-time pad (OTP) using this encryption key cannot be decrypted by an eavesdropper having any knowledge.

However, by the conventional technologies, it has been unfeasible to supply not only an encryption key but also a random number shared by QKD according to a request.

BRIEF DESCRIPTION OF THE DRAWINGS

FIG. 5 is a diagram illustrating an example of a key supply API according to the first embodiment;

FIG. 9 is a diagram illustrating an example of an API call and an API response according to the first embodiment;

FIG. 10A is a diagram illustrating a specific example of the API call according to the first embodiment;

FIG. 10B is a diagram illustrating a specific example of the API call according to the first embodiment;

FIG. 10C is a diagram illustrating a specific example of the API call according to the first embodiment;

FIG. 10D is a diagram illustrating a specific example of the API call according to the first embodiment;

FIG. 11A is a diagram illustrating a specific example of the API response according to the first embodiment;

FIG. 11B is a diagram illustrating a specific example of the API response according to the first embodiment;

FIG. 11C is a diagram illustrating a specific example of the API response according to the first embodiment;

DETAILED DESCRIPTION

A key management device according to an embodiment includes one or more hardware processors configured to function as a determination unit, a generation unit, and a supply unit. The determination unit is configured to determine a type of request data requested by a request message transmitted from an application that performs encrypted data communication. The generation unit is configured to generate a response message including at least one of a random number and an encryption key shared by quantum key distribution (QKD) via a communication network according to a type of the request data. The supply unit is configured to supply the response message to the application.

Hereinafter, embodiments of a key management device, a quantum cryptography communication system, and a computer program product will be described in detail with reference to the accompanying drawings.

In the QKD network, an application programming interface (API) technology for supplying an encryption key to an application has been standardized, and the API technology has started to be used. Furthermore, in the quantum cryptography communication system, there is a case where the application desires to use not only an encryption key that is a random number shared with another node but also a random number (unique random number) independent of the another node. Alternatively, in a case where cryptography communication is performed by a common key encryption method such as advanced encryption standard (AES) encryption, there is a case where it is desired to simultaneously acquire another random number used as an initialization vector (IV) in addition to the encryption key.

In the following embodiments, a key management device, a quantum cryptography communication system, and a program capable of supplying not only an encryption key but also a random number shared by QKD according to a request by the API will be described.

First Embodiment

First, a basic configuration of a quantum cryptography communication system will be described. Each of the transmission node and the reception node are collectively referred to as a node. The node of the embodiment is referred to as a trusted node (TN), for example. In addition, a function of performing encrypted data communication using a shared encryption key is referred to as an application separately from the node.

Example of Basic Configuration of Quantum Cryptography Communication System

Figure 1:
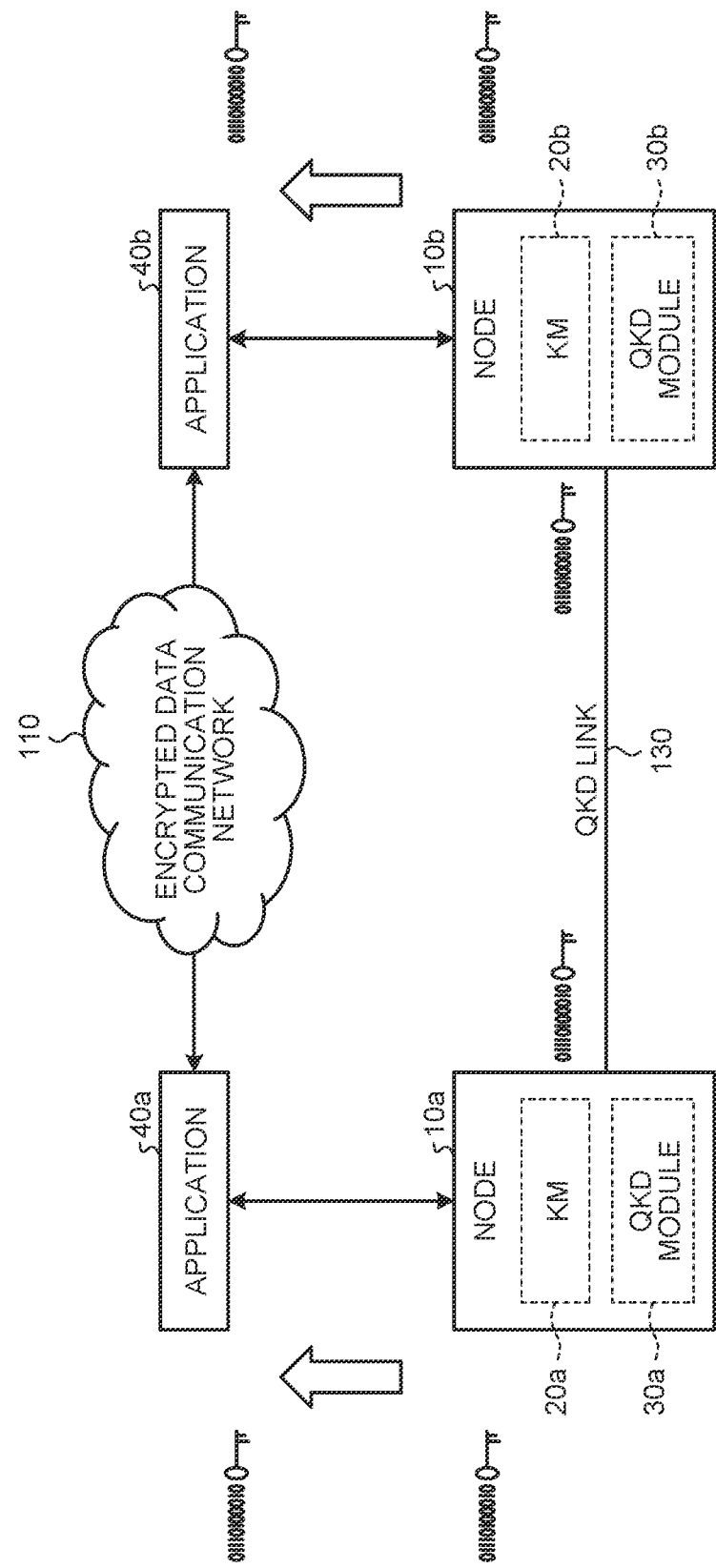
FIG. 1 is a diagram illustrating an example of a basic configuration of a quantum cryptography communication system according to a first embodiment.

FIG. 1 is a diagram illustrating an example of a basic configuration of a quantum cryptography communication system according to a first embodiment. A node 10a includes a KM 20a and a QKD module 30a. A key manager (KM) 20a is a key management device that manages an encryption key. The QKD module 30a shares an encryption key by quantum key distribution (QKD).

Note that the KM 20a and the QKD module 30a may be configured as a single device/system or may be configured as separate devices/systems. For example, node 10a may not include the QKD module 30a. In this case, the KM 20a of the node 10a and the QKD module 30a implemented as an external device of the node 10a are connected by a link. Since the description of a node 10b is similar to that of the node 10a, it is omitted.

In the example of FIG. 1, the encryption key shared by a QKD link 130 between the node 10a and node 10b are supplied to an application 40a and an application 40b. The applications 40a and 40b encrypt data using the encryption key acquired from the nodes 10a and 10b, and perform encrypted data communication. However, a method of sharing an encryption key in the QKD technology has a restriction on a distance in which an encryption key can be shared due to use of a single photon as a medium.

Example of Quantum Cryptography Communication System

Figure 2:
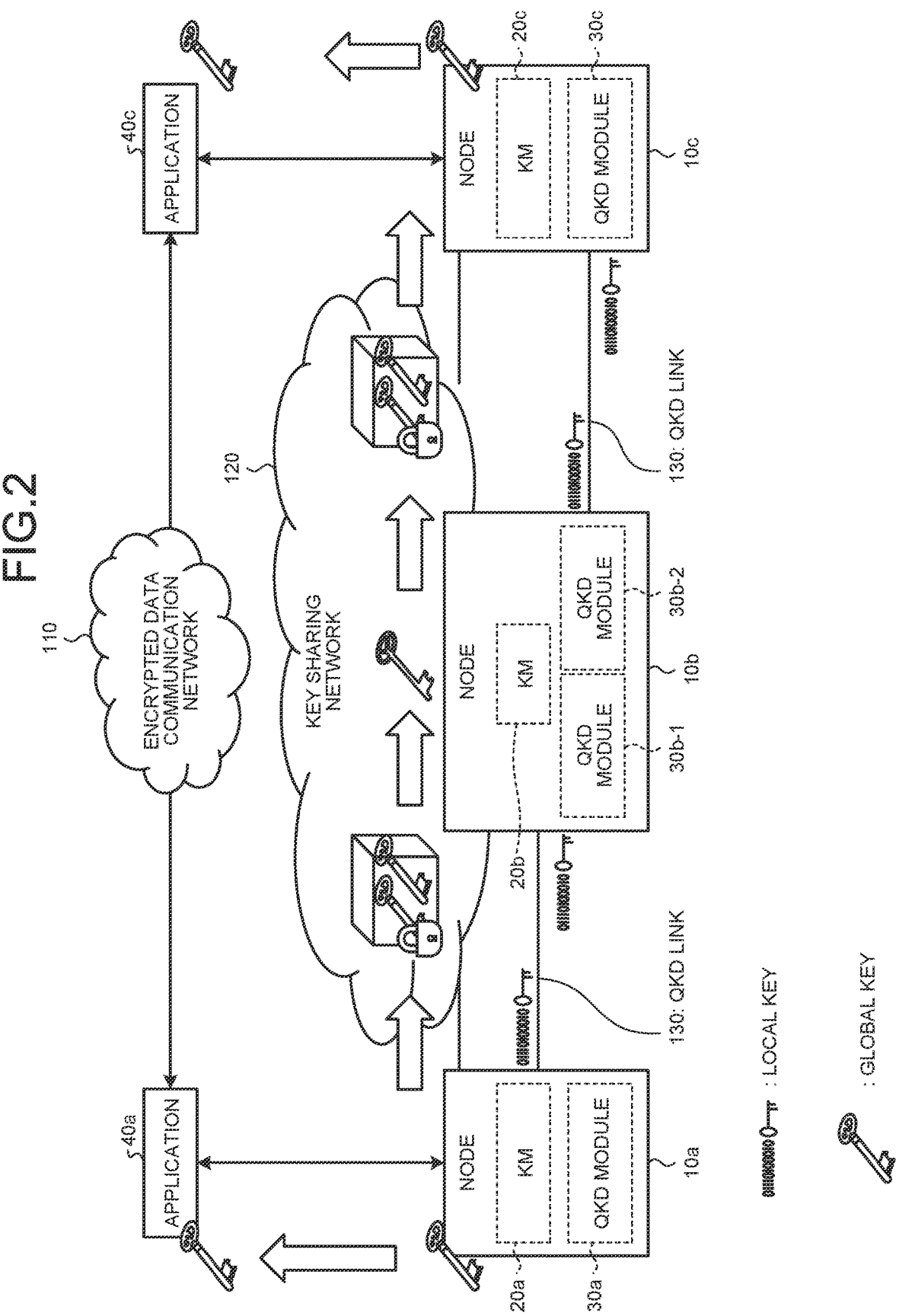
FIG. 2 is a diagram illustrating an example of a device configuration of the quantum cryptography communication system according to the first embodiment.

FIG. 2 is a diagram illustrating an example of a device configuration of a quantum cryptography communication system 100 according to the first embodiment. A node 10a includes a KM 20a and a QKD module 30a. The node 10a is connected to the application 40a. The node 10b includes a KM 20b and QKD modules 30b-1 to 30b-2. The node 10b is connected to both nodes 10a and 10c and thus includes two QKD modules 30b. The node 10c includes a KM 20c and a QKD module 30c. The node 10c is connected to an application 40c.

Hereinafter, in a case where the nodes 10a to 10c are not distinguished, they are simply referred to as a node 10. Similarly, when the KMs 20a to 20c are not distinguished, they are simply referred to as a KM 20. Similarly, when the QKD modules 30a to 30c are not distinguished, they are simply referred to as a QKD module 30. Similarly, when the applications 40a and 40c are not distinguished, they are simply referred to as an application 40.

In the example of FIG. 2, a key sharing network (QKD network) 120 and a QKD link 130 are configured by a communication network in which the nodes 10a to 10c each having functions of a transmission node and a reception node are connected to each other by an optical fiber link. Note that the key sharing network 120 may use a link different from the optical fiber of the QKD link 130 that performs key distribution by the QKD. The number of links is not limited. That is, the key sharing network 120 and the QKD link 130 may be independently configured by different optical fibers. The applications 40a and 40c are accommodated in an encrypted data communication network 110.

A case where encrypted data communication is performed between the application 40a and the application 40c will be described.

The QKD module 30 of each node 10 shares, as a local key, an encryption key shared by the QKD with the QKD module 30 of the neighboring node 10 connected by the optical fiber link. The KM 20a (20c) supplies a common encryption key (hereinafter, "global key") to the application 40a (40c). After this, the application 40a (40c) encrypts data using a global key supplied by the KM 20a (20c), and performs encrypted data communication.

Here, a specific example of a method of sharing a common global key between the applications 40a and 40c will be described. Note that the sharing method described herein is an example. As long as a common global key can be shared, a method of sharing the global key in the key sharing network 120 is not limited.

The node 10a generates a global key different from the local key from random number information and the like separately regardless of the QKD. The KM 20a of the node 10a encrypts the global key with the local key shared between the QKD modules 30a and 30b-1 and forwards the encrypted global key to the KM 20b of the neighboring node 10b. Next, the KM 20b of the neighboring node 10b encrypts the global key with the local key shared between the QKD modules 30b-2 and 30c, and forwards the encrypted global key to the KM 20c of the neighboring node 10c.

In this manner, by repeating the process of encrypting the global key with the local key and forwarding the global key, the node 10 can share the global key with any node 10 on the key sharing network 120. At this time, the global key is forwarded on the link in an encrypted state by the local key shared by the QKD. Therefore, assuming the safety of the node 10 itself, it can be said that the safety of the global key is ensured as in the local key.

Example of Global Key Supply Process

Figure 3:
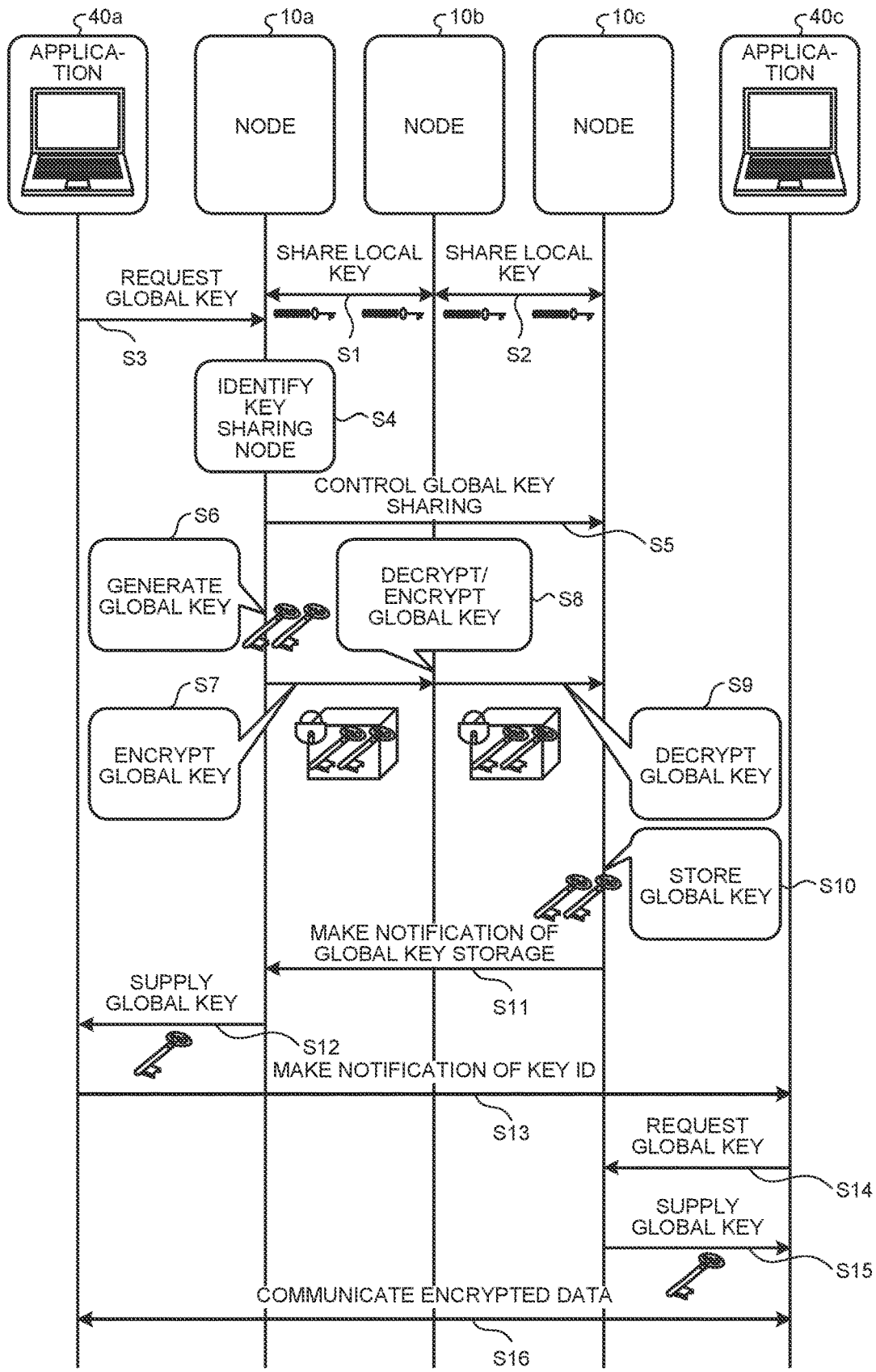
FIG. 3 is a sequence diagram illustrating an example of a global key supply process according to the first embodiment.

FIG. 3 is a sequence diagram illustrating an example of a global key supply process according to the first embodiment. In the example of FIG. 3, an example of a sequence in which the applications 40a and 40c perform encrypted data communication will be described. The application 40a is connected to the node 10a on the key sharing network 120. The application 40c is connected to the node 10c on the key sharing network 120.

First, a local key is shared between the nodes 10a and 10b by QKD (step S1). Next, the local key is shared by the nodes 10b and 10c by QKD (step S2).

Next, the application 40a transmits a global key request (global key request message) to the node 10a (step S3). The global key request indicates a request for a global key used for encrypted data communication with the application 40c.

Next, the node 10a identifies the node 10c (key sharing node in FIG. 3) connected to the application 40c communicating with the application 40a from, for example, the information of the application name (the application 40c) included in the global key request (step S4). Note that the node 10a may identify the node 10c connected to the application 40c by referring to data called a connection information directory.

Next, the node 10a starts global key sharing control with the node 10c (step S5). Specifically, the node 10a transmits a notification indicating a request for a global key sharing process to the node 10c.

The operation of the global key sharing process is as described above. For example, the node 10a sets a random number generated using a random number generator or the like as a global key (step S6), encrypts the global key with a local key shared with the node 10b (step S7), and transmits the encrypted global key to the node 10b. The node 10b decrypts the encrypted global key with the same local key as the local key of the node 10a to extract the global key. Next, the node 10b encrypts the global key with the local key shared with the node 10c (step S8), and transmits the encrypted global key to the node 10c. The node 10c decrypts the encrypted global key with the same local key as the local key used for encryption in the node 10b, and extracts the global key (step S9). Next, the node 10c stores the decrypted global key in a storage or the like (step S10). Next, the node 10c transmits a global key storage notification indicating that the global key has been stored to the node 10a (step S11).

Note that it is also possible to use a global key shared between the node 10a and the node 10c in advance without performing the global key sharing operation in steps S5 to S11.

Next, the node 10a transmits a global key response message for supplying the global key shared with the node 10c to the application 40a (step S12). The global key response message includes a global key shared by the nodes 10a and 10c and a key ID assigned to the global key.

Next, the application 40a notifies the application 40c of the key ID of the global key used for the cryptography communication (step S13). Note that this key ID notification may be notified prior to the cryptography communication between the applications 40a and 40c, or the application 40a may be notified together with encrypted data encrypted with the global key.

Next, when receiving a global key request (global key request message) from the application 40c (step S14), the node 10c supplies the global key stored in step S10 to the application 40c (step S15).

Note that the application 40c generates the global key request message when transmitting the encrypted data to the application 40a or when decrypting the encrypted data received from the application 40a. The global key request message includes the key ID of the global key requested by the application 40c. The node 10c returns a global key corresponding to the key ID included in the global key request message among the global keys shared with the node 10a to the application 40c (global key response message).

The applications 40a and 40c perform encrypted data communication using the common encryption key (global key) acquired by the above flow (step S16).

Figure 4:
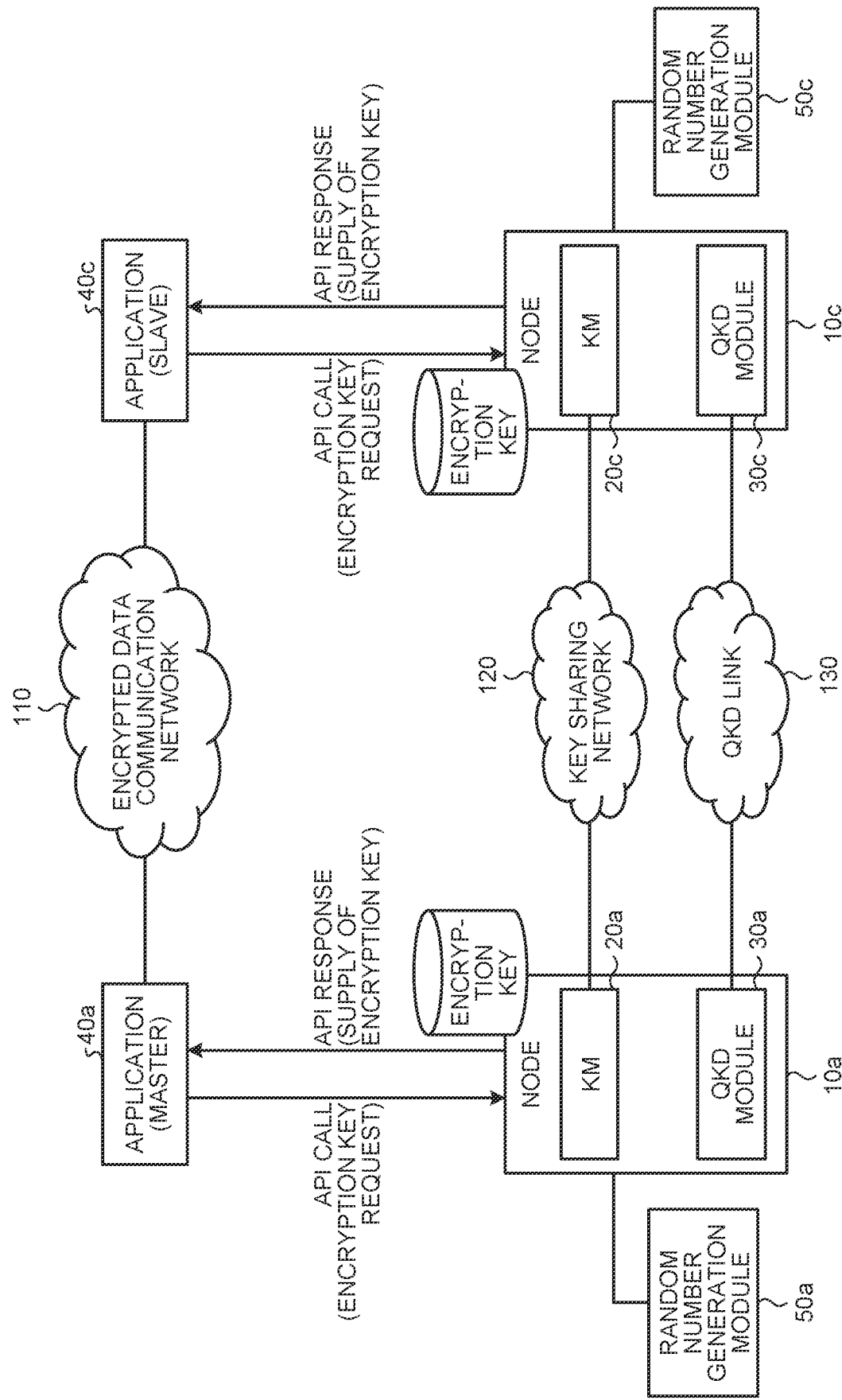
FIG. 4 is a diagram for explaining an example of a key supply interface according to the first embodiment.

FIG. 4 is a diagram for explaining an example of a key supply interface according to the first embodiment. In the example of FIG. 4, a random number generation module 50a that generates a random number used for the global key is further connected to the node 10a (10c).

The node 10a in FIG. 4 can be used as a mechanism for sharing any secret information such as an encryption key generated in another system and a secret key in a digital certificate/public key method. Furthermore, since the node 10a includes not only the KM 20a but also the QKD module 30a, the random number generation function of the random number generation module 50a may be used for key sharing in QKD. Note that the random number generation function may be provided in a device (for example, a random number generation management server device or the like) different from the node 10a as in the random number generation module 50a illustrated in FIG. 4, or may be incorporated in the node 10a.

In FIG. 4, the application 40a in which the cryptography communication session is started is referred to as a master, and the application 40c in which the cryptography communication session is received is referred to as a slave. The request message and the response message exchanged between the application 40 and the node 10 are achieved by, for example, calling of the Web API and a response thereof.

Example of Key Supply API

FIG. 5 is a diagram illustrating an example of a key supply API according to the first embodiment.

The first API is a state confirmation API (Get status API) by which the application 40 inquires the state of the node 10 or the quantum cryptography communication system.

The second API is a key acquisition API (Get key API) by which the application 40a serving as a master acquires an encryption key from the node 10a. The master application 40a designates, for example, the number of encryption keys by the key acquisition API. When the key acquisition API is called from the application 40a, the node 10a responds to the master application 40a by supplying the encryption key and the key ID of the encryption key.

The third API is a key acquisition API (Get key with key IDs API) by which the slave application 40c acquires an encryption key from the node 10c. The slave application 40c designates, for example, a key ID of an encryption key by the key acquisition API. When the key acquisition API is called from the application 40c, the node 10c responds to the slave application 40c by supplying the encryption key and the key ID of the encryption key.

Figures 6, 7:
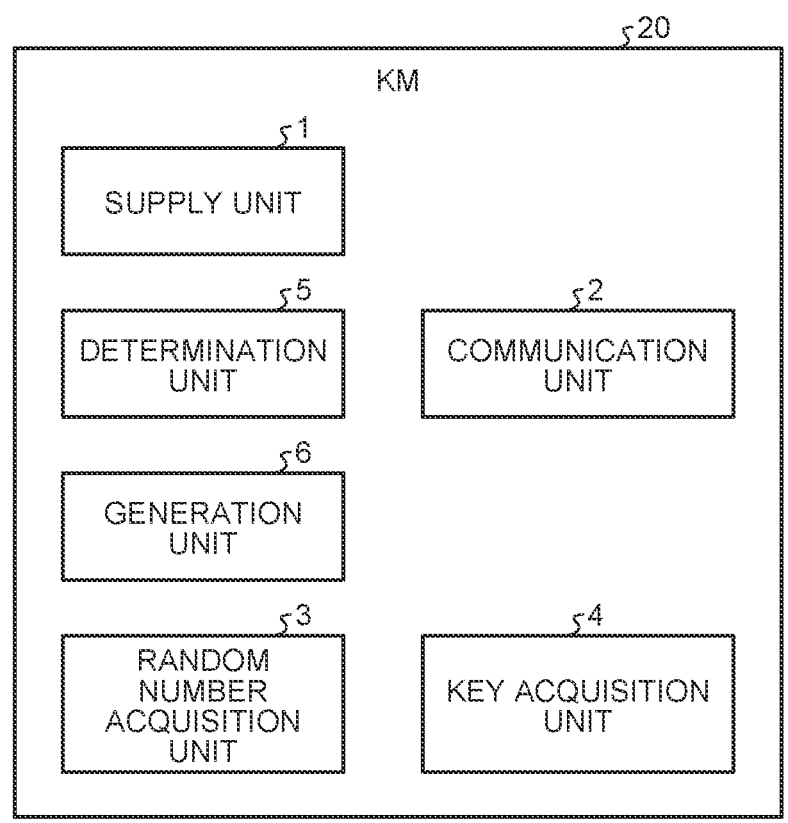
FIG. 6 is a diagram illustrating an example of a data format of an encryption key and a key ID according to the first embodiment.
FIG. 7 is a diagram illustrating an example of a functional configuration of a KM according to the first embodiment.

Note that, in a case where the encryption key and the key ID are defined in the JSON format in the second and third API responses, an example of the response data format is as illustrated in FIG. 6.

FIG. 6 is a diagram illustrating an example of a response data format of an encryption key and a key ID according to the first embodiment. The example of FIG. 6 illustrates a case of a response data format in which data of "key ID" indicating a key ID and data of "key" indicating an encryption key are associated with each other.

There is a case where the application 40 desires to use high-quality random number data during cryptography communication (for example, an initial vector (IV) for cryptography communication, a random number for secret sharing storage of data, and the like). In the first embodiment, assuming application to such a use case, the node 10 supplies a combination of the encryption key and the random number generated by a random number generation module 50 by the key supply API. The KM 20 that supplies the encryption key and the random number data integrally and efficiently generates, stores, and manages the encryption key and the random number.

Example of Functional Configuration

FIG. 7 is a diagram illustrating an example of a functional configuration of the KM 20 according to the first embodiment. The KM 20 according to the first embodiment includes a supply unit 1, a communication unit 2, a random number acquisition unit 3, a key acquisition unit 4, a determination unit 5, and a generation unit 6.

The supply unit 1 supplies the data generated by the generation unit 6 to the application 40 in response to a request message (API call) from the application 40.

The communication unit 2 communicates with another device. For example, the communication unit 2 performs communication for sharing a key or a random number, communication for making a notification of non-use of a key, communication for instructing deletion of a key, or the like with another KM 20.

The random number acquisition unit 3 acquires a random number from the random number generation module 50 or the like.

The key acquisition unit 4 acquires a key generated by QKD from the QKD module 30.

The determination unit 5 determines the supply data (at least one of the key and the random number) according to the request message from the application 40. For example, when receiving a request message (API call) designating at least one of the encryption key and the random number from the application 40, the determination unit 5 determines the necessary size and number of encryption keys, and the necessary size and number of random numbers. Furthermore, for example, when receiving a request message (API call) designating at least one of the encryption method, the communication destination, and the data size, the determination unit 5 determines the encryption keys having the necessary size and number, the necessary size and number of encryption keys, and the necessary size and number of random numbers according to the requested encryption method, communication destination, and data size.

The generation unit 6 generates data (at least one of a key and a random number) to be supplied to the application 40. The generation unit 6 generates data (for example, JSON data) to be returned in the same message format as a response message (API response) based on the determination by the determination unit 5. The response message includes at least one of the random number acquired from the random number acquisition unit 3 and the encryption key acquired from the key acquisition unit 4.

Example of Random Number Supply

Figure 8:
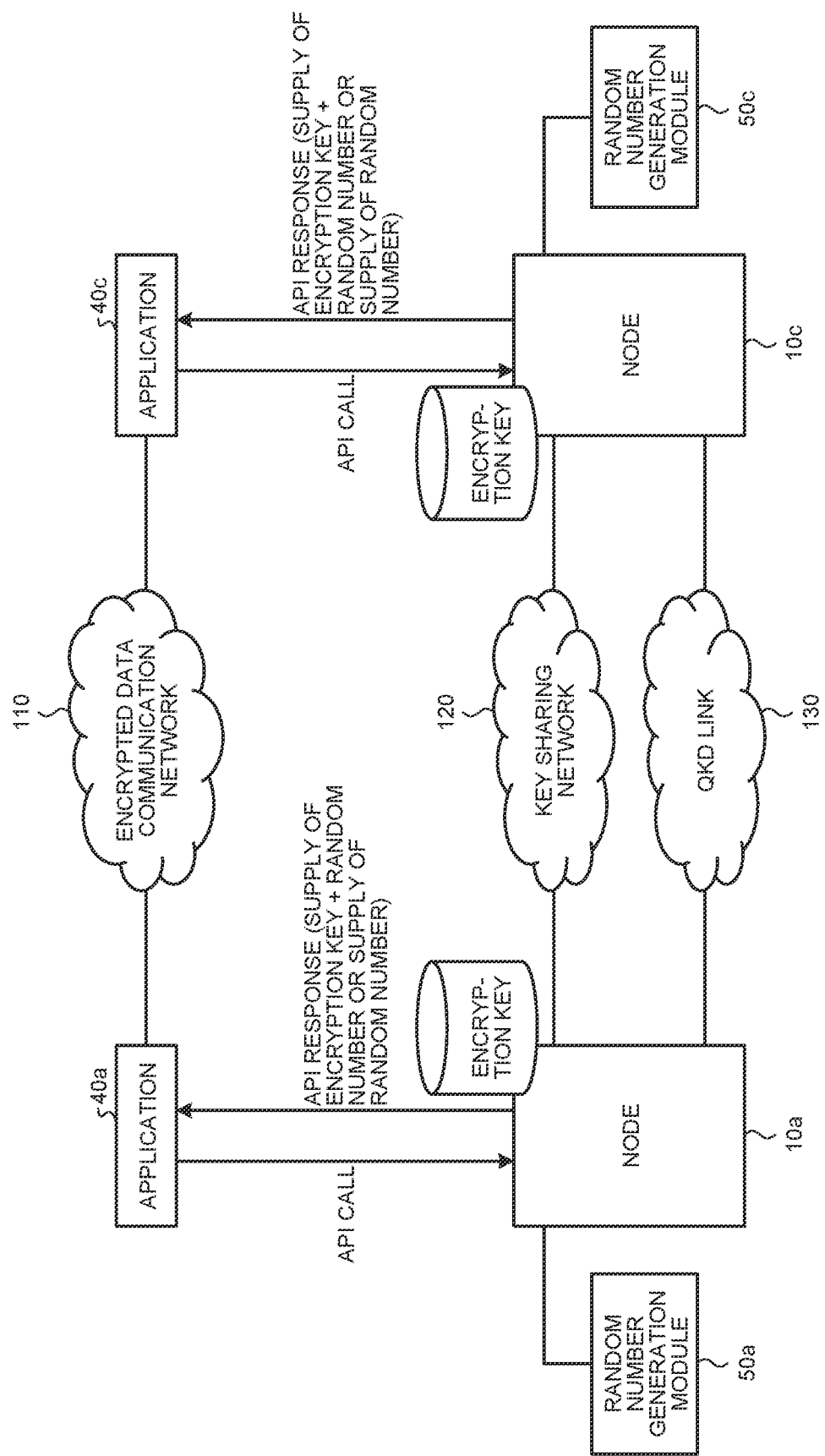
FIG. 8 is a diagram illustrating an example of supplying a random number according to the first embodiment.

FIG. 8 is a diagram illustrating an example of supplying a random number according to the first embodiment. As illustrated in FIG. 8, the node 10 of the first embodiment supplies a random number instead of the encryption key or supplies a random number in addition to the encryption key by an API response (response message) according to an API call (request message) from the application 40a to the node 10a. That is, the node 10 of the first embodiment supplies the application 40 connected to the node 10 with the random number and the encryption key at the same time, or supplies the random number in a message format similar to the supply of the encryption key. As a result, for example, an IV (random number) having an appropriate size for use in cryptography communication can be supplied by a single API call simultaneously when the key is supplied. Furthermore, for example, in a case where data protection by secret sharing and cryptography communication using an encryption key are simultaneously performed, they can be supplied by a single API call.

Example of API Call and Response

FIG. 9 is a diagram illustrating an example of an API call and a response according to the first embodiment. FIG. 9 illustrates an example of a relationship (combination) between the API call (request) and the API response (response).

Item number 1 is a case where only the encryption key is received from the node 10. A request for an encryption key is made as an API call, and the encryption key is supplied as an API response.

Item number 2 is a case where not only the encryption key but also the random number is received from the node 10. A request for an encryption key is made as an API call, and the random number in addition to the encryption key are supplied as an API response.

Item number 3 is a case where only a random number is received from the node 10. A request for a random number is made as an API call, and the random number is supplied as an API response.

Item number 4 is a case where not only the random number but also the encryption key is received from the node 10. A request for a random number is made as an API call, and the encryption key in addition to the random number are supplied as an API response.

Item number 5 is a case where a random number and an encryption key are received from the node 10. A request for an encryption key and a random number is made as an API call, and the encryption key and the random number are supplied as an API response.

Item number 6 is a case where a random number and an encryption key are received from the node 10. A communication method or a communication destination is designated as API call, and the encryption key and the random number are supplied as an API response. Note that, for item number 6, for example, encryption keys and random numbers having different types, sizes, and numbers may be supplied according to the designated communication destination.

Note that which API operation of the APIs of item numbers 1 to 6 is enabled is determined by setting of the node 10, for example. For example, the API call is a request for an encryption key in both item numbers 1 and 2, but whether to supply the encryption key as an API response or supply the random number in addition to the encryption key is determined by setting of the node 10.

In addition, the encryption key included in the API response may be any key depending on the use. For example, the encryption key included in the API response may be any key, and is, for example, the local key, the global key, or the like described above.

Specific Example of API Call

FIGS. 10A to 10D are diagrams illustrating specific examples of API calls (requests) according to the first embodiment. The request message from the application 40 is achieved by, for example, the API of FIGS. 10A to 10D. {KME_hostname} included in url of the POST method indicates a host name (IP address) of the node 10. In FIGS. 10A to 10D, the parameter is designated by the request body of the POST method, but may be designated by the GET method.

FIG. 10A is a case where a random number is designated and called by the API call. When only a random number is requested, it is not necessary to designate the communication destination by a parameter. For example, in the example of FIG. 10A, in the request body of the POST parameter, the type (in the example of FIG. 10A, "rng" indicating a random number), the number (in the example of FIG. 10A, 3), and the size (in the example of FIG. 10A, 1024) of the requested data are designated by parameters.

Note that the type in FIG. 10A is a parameter that designates at least one of an encryption key and a random number as the type of data requested from the application 40. "number" is a parameter that identifies the number of pieces of request data. "size" is a parameter that identifies the size of the request data. The generation unit 6 generates a response message including the request data having a size and the number designated by the request message by the API.

FIG. 10B illustrates a case where a key and a random number are designated and called. In the API of FIG. 10B, since the key is acquired, the communication destination is designated in (SAE_ID). In "SAE_ID", for example, an ID for identifying the application 40 as the communication destination is designated. For example, in the example of FIG. 10B, in the request body of the POST parameter, the type, the number, and the size of the requested data are designated by parameters. For example, type "key" included in the parameter in the second line of the request body of the POST parameter in FIG. 10B indicates an encryption key, "number" indicates the number of encryption keys, and "size" indicates the size of the encryption key.

FIG. 10C is a case where a key and a random number are designated and called by the same API call as in FIG. 10B, but the random number size is not designated in the request body of the POST parameter, for example. For example, in the request body of the POST parameter, when a key is requested, the number and the size parameters are designated, and when a random number is requested, the number and the size are not designated. In this case, the KM 20 of the node 10 determines the number and the size of the random numbers based on the setting of the KM 20 and the like.

FIG. 10D illustrates a case where the communication scheme is designated. The API in FIG. 10D is called by the same API call (same url designation) as that in FIG. 10B, but for example, the size and the number of keys and the size and the number of random numbers are not designated in the request body of the POST parameter, and the encryption method (in the example of FIG. 10D, "default AES") to be used is designated. In this case, the KM 20 of the node 10 determines the number and the size of the random numbers based on the encryption method to be used.

Note that the request message by the API call in FIG. 10D may include at least one of a method parameter designating an encryption method used by the application 40 and a communication destination parameter designating a communication destination of the application 40. In a case where the method parameter is included in the request message, the generation unit 6 generates a response message including at least one of the encryption key and the random number according to the method parameter. Furthermore, in a case where the communication destination parameter is included in the request message, the generation unit 6 generates the response message including at least one of the encryption key and the random number according to the communication destination parameter.

Furthermore, the request message by the API call in FIG. 10D may further include a size parameter designating a data size. In this case, the generation unit 6 generates the response message including at least one of the encryption key having a size designated by the size parameter and the random number having a size designated by the size parameter.

In addition, the request message by the API call may include a size parameter designating the data size of the transmission data. In a case where the size parameter is included in the request message, the generation unit 6 generates a response message including at least one of the encryption key used for an encryption process of data having a size designated by the size parameter and the random number used for an encryption process of data having a size designated by the size parameter.

Specifically, in a case where only the size parameter is designated by the API call, the generation unit 6 generates a response message including the encryption key used for the encryption process of data of the size designated by the size parameter and the random number used for the encryption process of data of the data size. The random number used for the encryption process includes, for example, a random number used as the IV and a random number necessary for protecting data of the size with secret sharing.

Specific Example of API Response

FIGS. 11A to 11C are diagrams illustrating specific examples of API responses (responses) according to the first embodiment. FIGS. 11A to 11C illustrate examples of returning a response in the JSON format.

FIG. 11A is a case where a random number is returned. "rng" represents data indicating a random number. "rng_ID" indicates identification information for identifying a random number. Note that the case of returning the encryption key has the same format as that of FIG. 11A.

FIG. 11B is a case where both the key and the random number are returned. "key" indicates data indicating an encryption key. "key_ID" indicates identification information for identifying an encryption key. For example, when AES is used as the encryption method and the random number is used as IV, the size of the random number and the size of one encryption key often match. In addition, for example, in a case where a random number is used for data protection by secret sharing and OTP is used for cryptography communication, the size may be different depending on the handling of headers or the like of communication data and stored data, but the size of the random number and the size of the encryption key are substantially the same.

FIG. 11C illustrates a case where a key and a random number are combined and returned. For example, a key used for AES and IV are combined and returned.

For example, as illustrated in FIGS. 11A to 11C, in the generation unit 6, there are a case where the type of data supplied in response to the request is an encryption key, a case where the type of data supplied in response to the request is a random number, and a case where the type of data supplied in response to the request is both the encryption key and the random number. In these cases, the response message is generated by describing the response message using a message format (in the examples of FIGS. 11A to 11C, JSON format) of the same format.

Operation Example of KM

Figure 12:
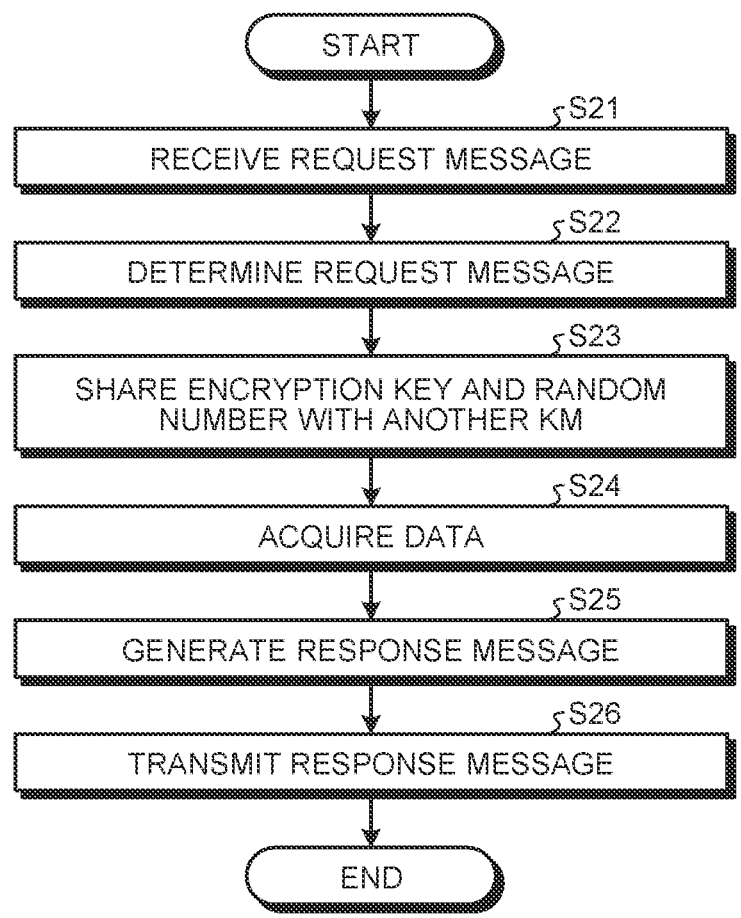
FIG. 12 is a flowchart illustrating an operation example of the KM according to the first embodiment.

FIG. 12 is a flowchart illustrating an operation example of the KM 20 according to the first embodiment. First, the supply unit 1 receives a request message (API call) from the application 40 (step S21). For example, at least one of an encryption key and a random number is designated in the request message. Furthermore, for example, at least one of an encryption method, a communication destination, and a data size is designated in the request message.

Next, the determination unit 5 determines the size and the number of encryption keys and the size and the number of random numbers according to the request message received in step S21 (step S22).

Next, the KM 20 performs communication for acquiring the same encryption key or random number in the communication unit 2 (communication for sharing the same encryption key or random number) with another KM 20 (Step S23). This communication may be performed in advance before step S24 of acquiring data, or may be performed before step S21 or step S22.

Next, the KM 20 acquires data based on the determination result of step S22 (step S24). For example, when a random number is requested, the random number acquisition unit 3 acquires random numbers having the requested size and the number from the random number generation module 50.

Furthermore, for example, in a case where an encryption key is requested, the key acquisition unit 4 acquires encryption keys having the requested size and the number from the QKD module 30.

Next, the generation unit 6 generates a response message by using the data acquired in step S24 (step S25). Next, the supply unit 1 supplies the application 40 with the response message generated in step S25 (step S26).

Exemplary Supply of Encryption Key

Figure 13:
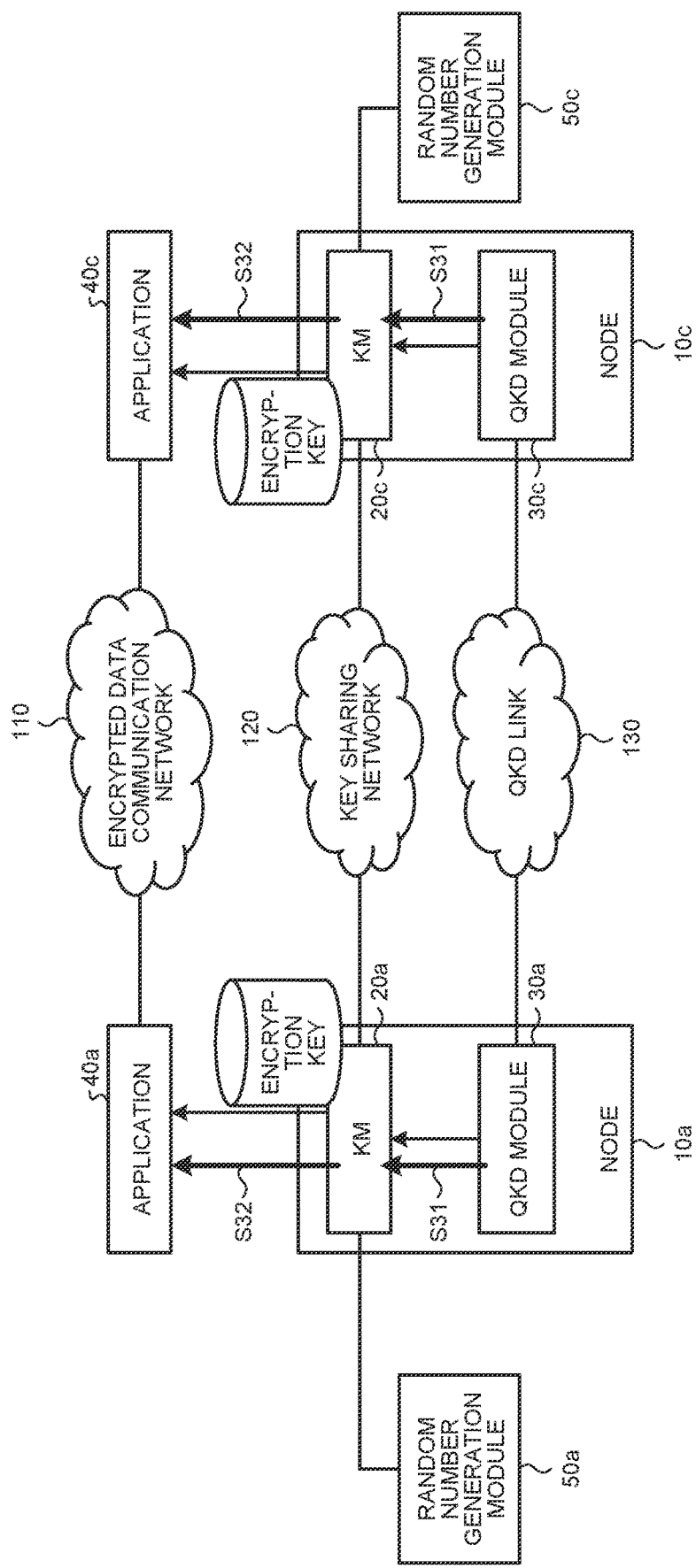
FIG. 13 is a diagram illustrating an example of supplying an encryption key according to the first embodiment.

FIG. 13 is a diagram illustrating an example of supplying an encryption key according to the first embodiment. First, the KM 20a acquires the encryption key from the QKD module 30a, and the KM 20c acquires the encryption key from the QKD module 30c (step S31). Next, the KM 20a supplies the application 40a with the encryption key acquired in step S31, and the KM 20c supplies the application 40c with the encryption key acquired in step S31 (step S32).

Note that the encryption key to be supplied may be a local key (an encryption key shared by the QKD link 130) or a global key (an encryption key shared by the key sharing network 120). The encryption key to be supplied may be an encryption key already accumulated in the storage device of the KM 20.

Example of Random Number Supply

Figure 14:
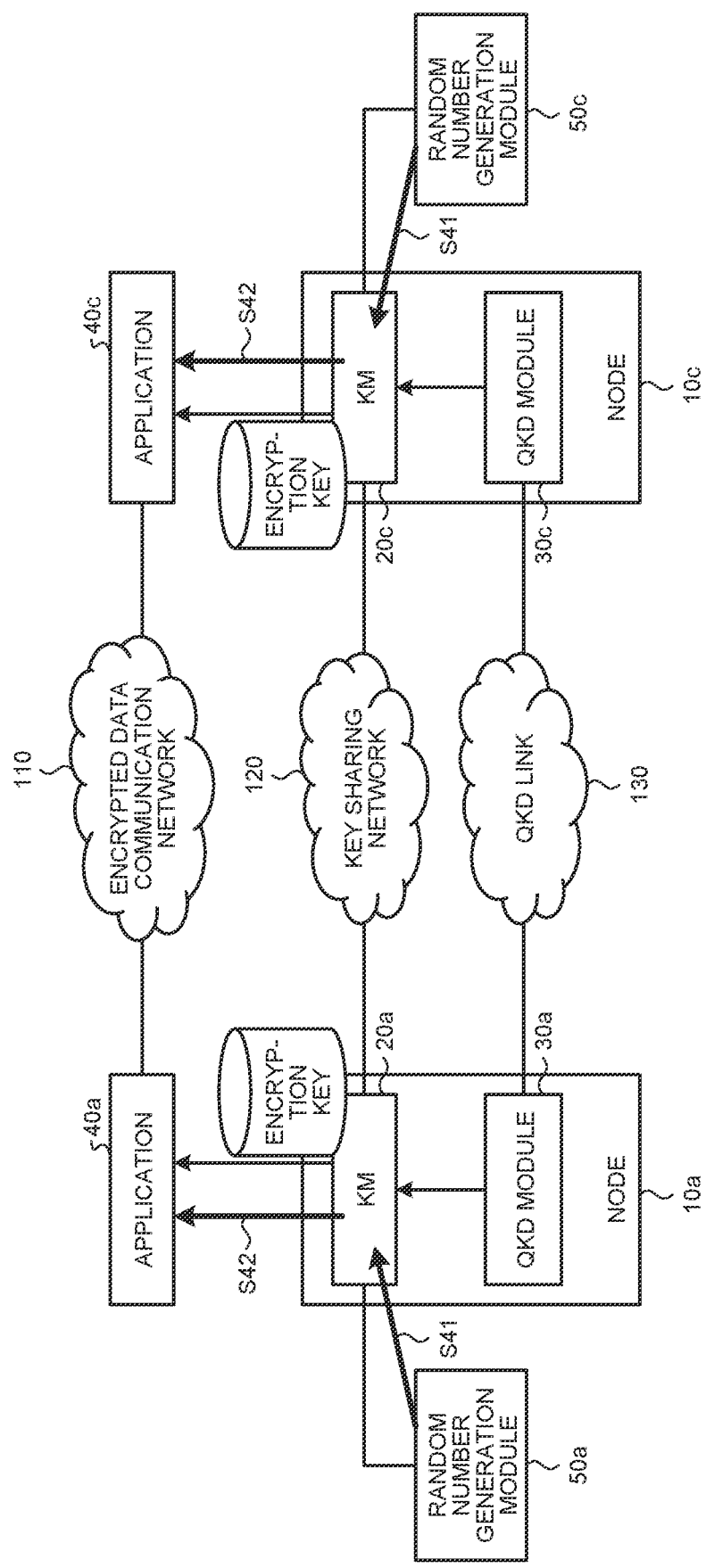
FIG. 14 is a diagram illustrating an example of supplying a random number according to the first embodiment.

FIG. 14 is a diagram illustrating an example of supplying a random number according to the first embodiment. First, the KM 20a acquires a random number from the random number generation module 50a, and the KM 20c acquires a random number from a random number generation module 50c (step S41). Next, the KM 20a supplies the application 40a with the random number acquired in step S41, and the KM 20c supplies the application 40c with the random number acquired in step S41 (step S42).

Note that the random number to be supplied may be a random number already accumulated in the storage device of the KM 20.

As described above, in the key management device (KM 20) according to the first embodiment, the communication unit 2 performs communication for acquiring the same encryption key or random number with another KM 20. The supply unit 1 receives a request message from the application 40 that performs encrypted data communication. The determination unit 5 determines the type of request data requested by the request message. The generation unit 6 generates a response message including at least one of the encryption key shared by the QKD via the communication network (at least one of a QKD network 120 that shares a global key and a QKD link 130 that shares a local key) and the random number according to the type of request data. Specifically, the generation unit generates a response message including at least one of a global key shared via the QKD network 120, a local key shared via the QKD link 130, and a random number according to the type of request data. The supply unit 1 supplies the application 40 with the response message.

As a result, according to the key management device (KM 20) of the first embodiment, it is possible to supply not only the encryption key but also the random number shared by the QKD according to the request.

Second Embodiment

Next, the second embodiment will be described. In the description of the second embodiment, the description similar to that of the first embodiment will be omitted, and portions different from those of the first embodiment will be described.

Example of Functional Configuration

Figure 15:
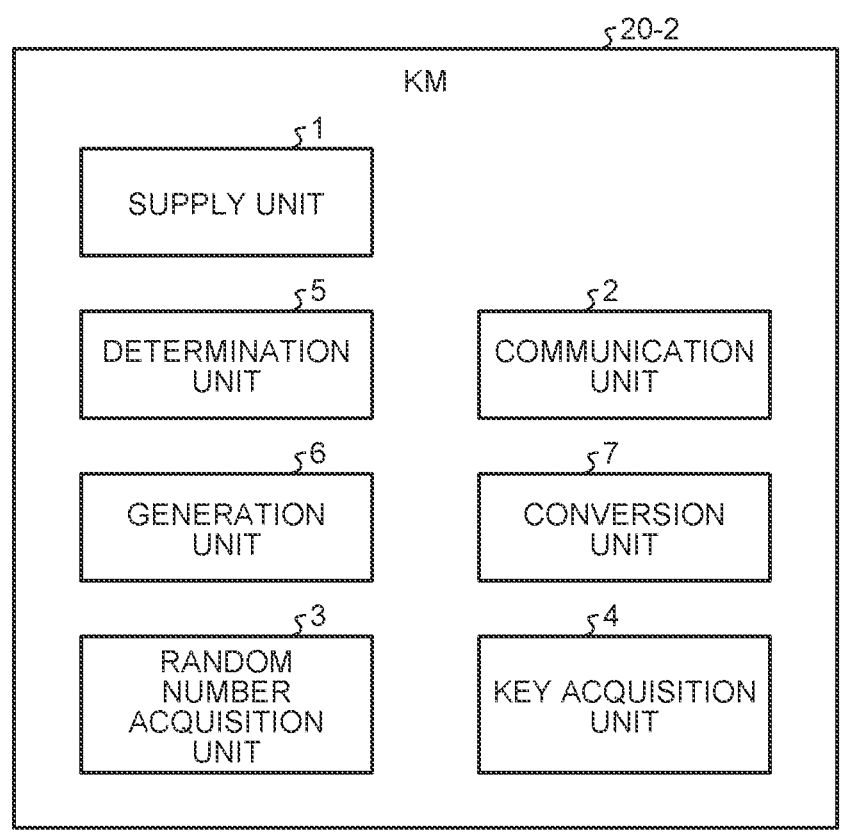
FIG. 15 is a diagram illustrating an example of a hardware configuration of a KM according to a second embodiment.

FIG. 15 is a diagram illustrating an example of a functional configuration of a KM 20-2 according to the second embodiment. The KM 20-2 according to the second embodiment includes a supply unit 1, a communication unit 2, a random number acquisition unit 3, a key acquisition unit 4, a determination unit 5, a generation unit 6, and a conversion unit 7. In the KM 20-2 of the second embodiment, the conversion unit 7 is further added.

The conversion unit 7 converts encryption key data for an encryption key into random number data for a random number, or converts random number data for a random number into encryption key data for an encryption key. By the process of the conversion unit 7, the random number can be shared with another KM 20-2 and made available as an encryption key. In addition, by the process of the conversion unit 7, the encryption key shared with another KM 20-2 can be made available as a random number.

The determination unit 5 of the second embodiment also has a function of determining whether to use the conversion unit 7 when supplying at least one of a random number and an encryption key in response to a request. For example, in a case where the encryption key is supplied, the determination unit 5 determines which is more appropriate, supplying the accumulated encryption key or converting the random number into the encryption key to supply as the encryption key, based on the amount of encryption keys currently accumulated (generated, managed) and the amount of random numbers currently accumulated (generation, management).

The appropriateness is determined based on the viewpoint and the like of the utilization efficiency of the accumulated encryption keys and the accumulated random numbers. For example, when the encryption key is requested, in a case where the accumulated (generated, managed) amount of encryption keys is smaller than a threshold value, the determination unit 5 determines that a random number is converted into an encryption key and supplied as the encryption key.

Specifically, when the request data is the encryption key, the determination unit 5 determines whether the accumulation amount of encryption keys in the KM 20-2 is smaller than the first threshold value. Next, when the accumulation amount of encryption keys is smaller than the first threshold value, the conversion unit 7 converts the random number acquired from the random number acquisition unit 3 into the encryption key. Next, the communication unit 2 encrypts the converted encryption key indicating the encryption key converted from the random number with the encryption key shared by the QKD, and transmits the encrypted converted encryption key to the KM 20-2 connected to the application 40 on the reception side of the encrypted data communication. Then, the generation unit 6 generates a response message including the converted encryption key.

By making the converted encryption key available, for example, in a case where the accumulation amount of encryption keys is smaller than the first threshold value, the encryption key can be supplied even when a large amount of the encryption keys is requested.

Similarly, for example, when a random number is requested, in a case where the accumulated (generated, managed) amount of random numbers is smaller than a threshold value, the determination unit 5 determines that the encryption key is converted into a random number and supplied as the random number.

Specifically, when the request data is a random number, the determination unit 5 determines whether the accumulation amount of the random numbers in the KM 20-2 is smaller than the second threshold value. Next, in a case where the accumulation amount of the random numbers is smaller than the second threshold value, the conversion unit 7 converts the encryption key acquired from the key acquisition unit 4 into the random number. Next, the communication unit 2 transmits, to the KM 20-2 sharing the encryption key converted into the random number, communication for making notification of the non-use or deletion of the encryption key converted into the random number. Then, the generation unit 6 generates a response message including a converted random number indicating the random number converted from the encryption key.

By making the converted random number available, for example, in a case where the accumulation amount of the random numbers is smaller than the second threshold value, the random number can be supplied even when a large amount of random numbers is requested.

Operation Example of KM

Figure 16:
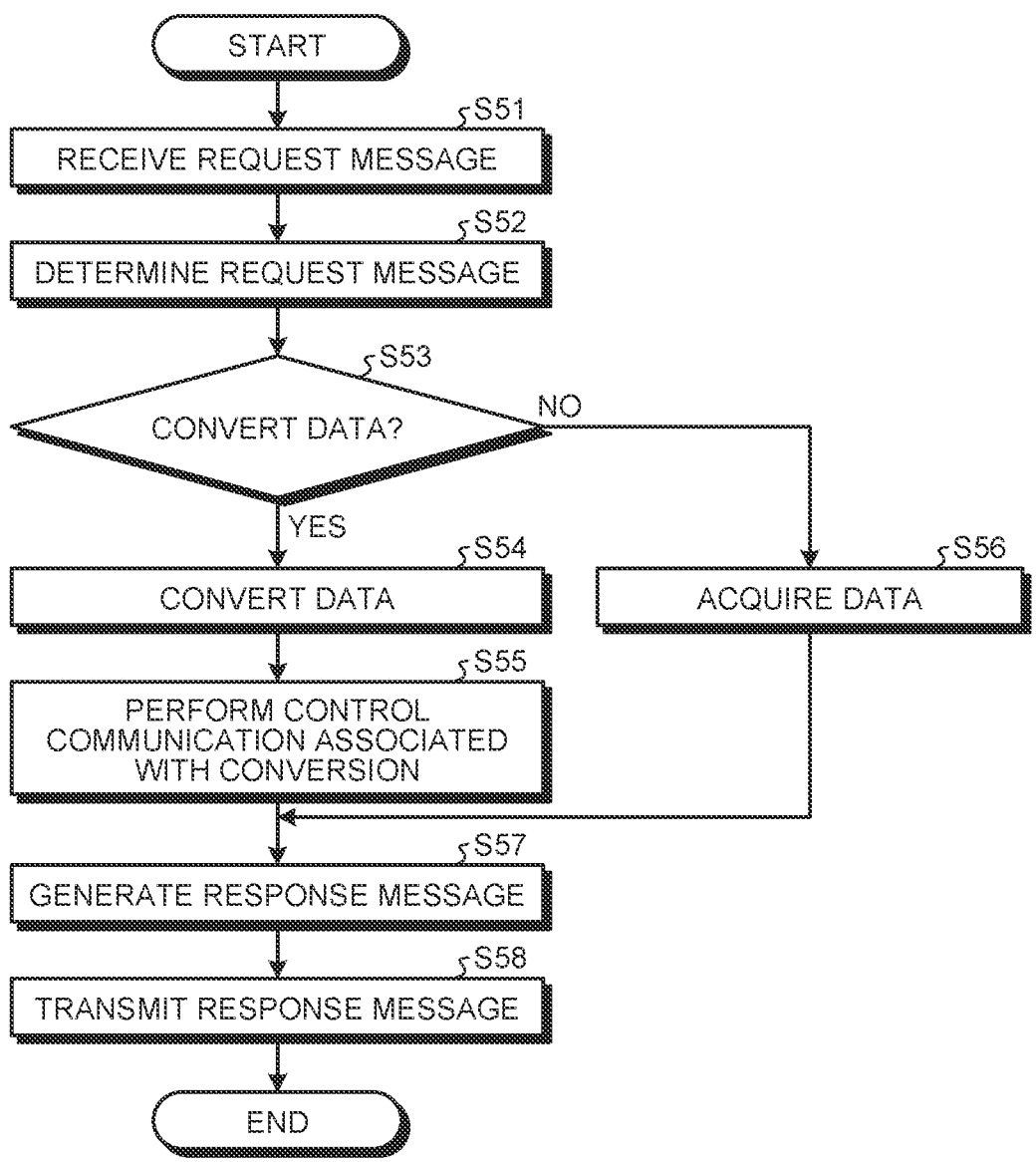
FIG. 16 is a flowchart illustrating an operation example of the KM of the second embodiment.

FIG. 16 is a flowchart illustrating an operation example of the KM 20-2 of the second embodiment. First, the supply unit 1 receives a request message (API call) from the application 40 (step S51). Details of step S51 are similar to those of step S21 in FIG. 12 of the first embodiment.

Next, the determination unit 5 determines the size and the number of encryption keys and the size and the number of random numbers according to the request message received in step S51 (step S52).

Next, the determination unit 5 determines whether to convert data with respect to the encryption key and the random number (step S53).

In a case where the data is not converted (step S53, No), the process of steps S56 to S58 is executed. Since the process in the case of not converting the data is similar to that of steps S24 to S26 in FIG. 12 of the first embodiment, the description thereof is omitted.

When the data is converted (step S53, Yes), the conversion unit 7 converts the data (step S54). Specifically, in a case where the encryption key is converted into a random number, the key acquisition unit 4 acquires the encryption key data corresponding to the random number having the size and the number requested by the request message from the storage device of the QKD module 30 or the KM 20-2. In the case that the random number is converted into the encryption key, the random number acquisition unit 3 acquires the random number data corresponding to the encryption key having the size and the number requested by the request message from the storage device of the random number generation module 50 or the KM 20-2.

Next, the communication unit 2 performs control communication associated with data conversion (step S55). Specifically, when converting the encryption key into a random number, the communication unit 2 notifies another KM 20-2 sharing the encryption key to be converted that the encryption key is converted into the random number. In addition, the communication unit 2 performs communication for requesting non-use or deletion of the encryption key. When converting the random number into the encryption key, the communication unit 2 encrypts the random number using an encryption key shared with another KM 20-2, and transmits the encrypted random number to the another KM 20-2, thereby sharing the encryption key converted from the random number with the another KM 20-2.

Next, the generation unit 6 generates a response message by using the data converted in step S54 (step S57). Since the process of step S58 is similar to that of step S26 of FIG. 12 of the first embodiment, the description thereof will be omitted.

Exemplary Supply of Encryption Key Converted from Random Number

Figure 17:
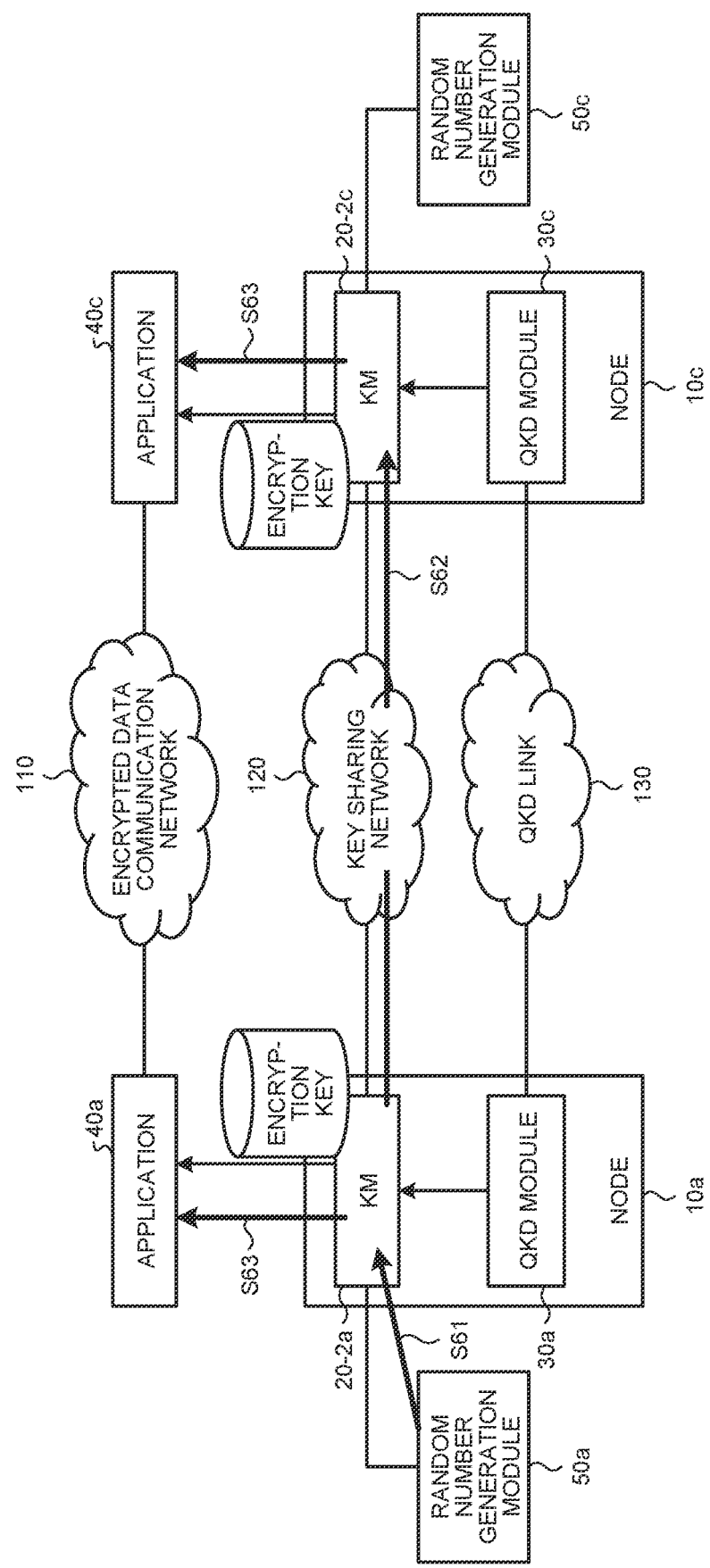
FIG. 17 is a diagram illustrating an example of supplying an encryption key converted from a random number according to the second embodiment.

FIG. 17 is a diagram illustrating an example of supplying an encryption key converted from a random number according to the second embodiment. First, the KM 20-2a acquires a random number from the random number generation module 50a (step S61). The conversion unit 7 converts the random number acquired in step S61 into an encryption key.

Next, the KM 20-2a encrypts the encryption key converted from the random number using the encryption key shared with the KM 20-2c, and transmits the encrypted encryption key to the KM 20-2c, thereby sharing the encryption key converted from the random number with the KM 20-2c (step S62).

At this time, the security of the communication path sharing the encryption key converted from the random number is equivalent to QKD because the encryption key generated by QKD and shared is used for the encryption of communication.

Next, the KM 20-2a supplies the encryption key converted from the random number to the application 40a, and the KM 20-2c supplies the encryption key shared in step S62 to the application 40c (step S63).

Note that the random number to be converted may be a random number already accumulated in the storage device of the KM 20-2a. As for the KM 20-2c, the random number acquired from the random number generation module 50c can be shared with the KM 20-2a as the encryption key in the same manner as in the case of the KM 20-2a.

Example of Supplying Random Number Converted from Encryption Key

Figure 18:
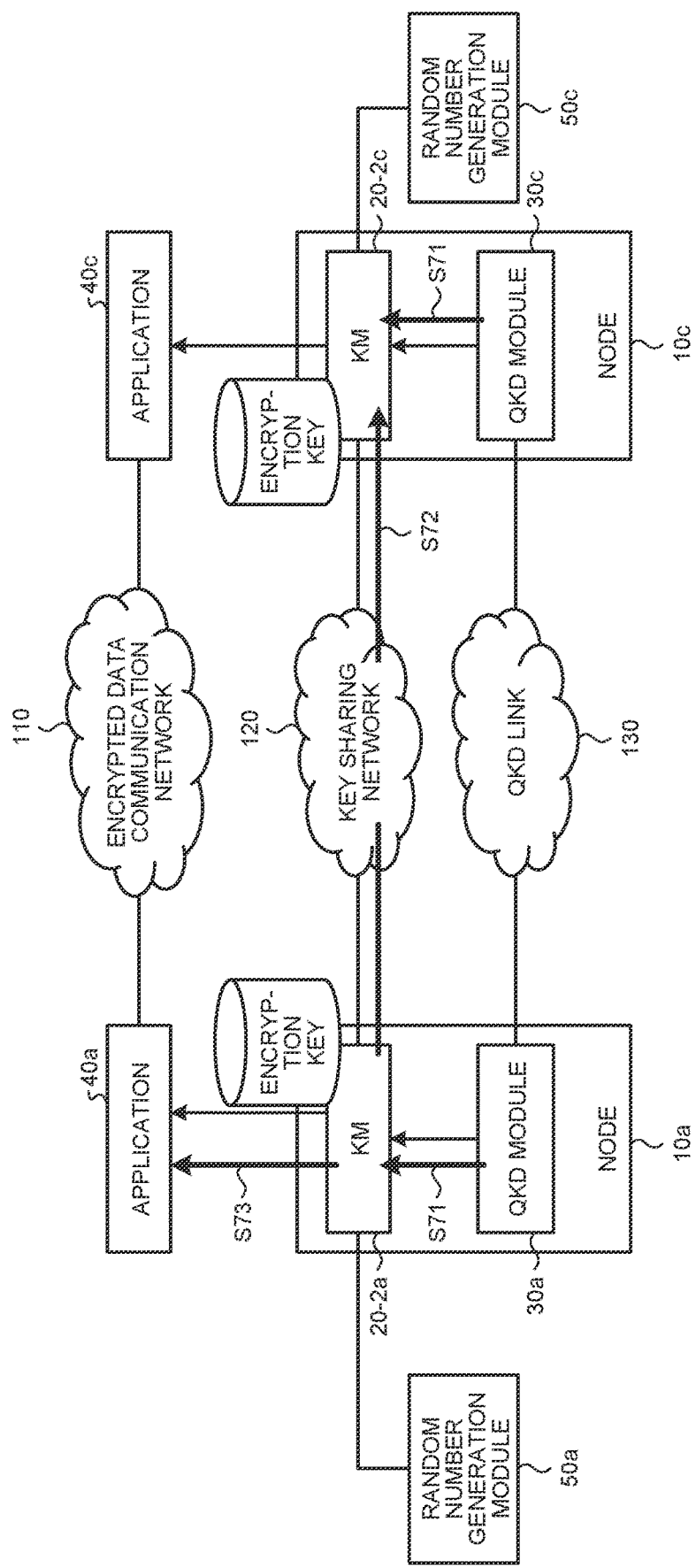
FIG. 18 is a diagram illustrating an example of supplying a random number converted from an encryption key according to the second embodiment.

FIG. 18 is a diagram illustrating an example of supplying a random number converted from an encryption key according to the second embodiment. First, the KM 20-2a acquires an encryption key from the QKD module 30a (step S71). The conversion unit 7 converts the encryption key acquired in step S71 into a random number.

Next, the KM 20-2a notifies the KM 20-2c, which shares the encryption key to be converted, that the encryption key is converted into random number, and performs communication to request non-use or deletion of the encryption key (step S72). Next, the KM 20-2a supplies the random number converted from the encryption key to the application 40a (step S73).

Note that the encryption key to be converted may be a local key (an encryption key shared by the QKD link 130) or a global key (an encryption key shared by the key sharing network 120). In addition, the encryption key to be converted may be an encryption key already accumulated in the storage device of the KM 20-2a. As for the KM 20-2c, the encryption key acquired from the QKD module 30c can be supplied to the application 40c as the random number in the same manner as in the case of the KM 20-2a.

Finally, an example of a hardware configuration of the KM 20 (20-2) and the QKD module 30 according to the first and second embodiments will be described.

Example of Hardware Configuration

Figure 19:
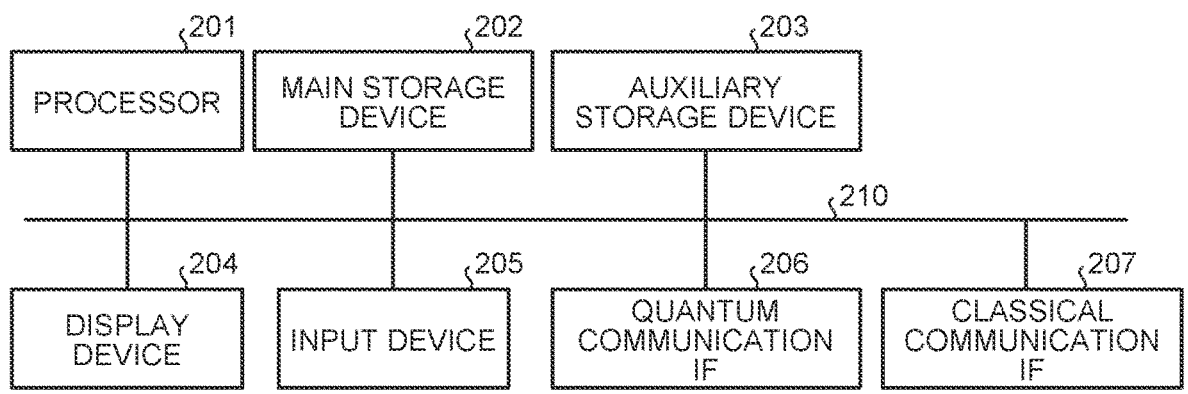
FIG. 19 is a diagram illustrating an example of a hardware configuration of a QKD module according to the first and second embodiments.

FIG. 19 is a diagram illustrating an example of a hardware configuration of the QKD module 30 according to the first and second embodiments. The QKD module 30 includes a processor 201, a main storage device 202, an auxiliary storage device 203, a display device 204, an input device 205, a quantum communication IF 206, and a classical communication IF 207. The processor 201, the main storage device 202, the auxiliary storage device 203, the display device 204, the input device 205, the quantum communication IF 206, and the classical communication IF 207 are connected via a bus 210.

The processor 201 executes a program read from the auxiliary storage device 203 to the main storage device 202. The main storage device 202 is a memory such as a read only memory (ROM) and a random access memory (RAM). The auxiliary storage device 203 is a hard disk drive (HDD), a memory card, or the like.

The display device 204 displays the state and the like of the QKD module 30. The input device 205 receives an input from the user. Note that the QKD module 30 may not include the display device 204 and the input device 205.

The quantum communication IF 206 is an interface for connection a quantum cryptography communication path (optical fiber link). The classical communication IF 207 is an interface for connection to a QKD control signal communication path, the KM 20, and the like. When the QKD module 30 does not include the display device 204 and the input device 205, for example, a display function and an input function of an external terminal connected via the classical communication IF 207 may be used.

Figure 20:
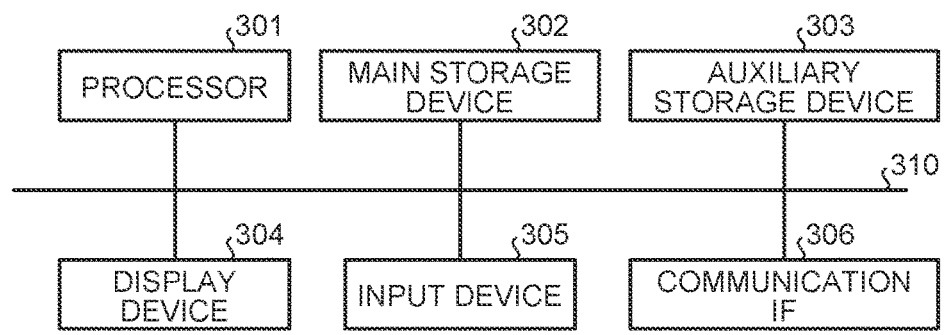
FIG. 20 is a diagram illustrating an example of a hardware configuration of the KM according to the first and second embodiments.

FIG. 20 is a diagram illustrating an example of a hardware configuration of the KM 20 (20-2) according to the first and second embodiments. The KM 20 includes a processor 301, a main storage device 302, an auxiliary storage device 303, a display device 304, an input device 305, and a communication IF 306. The processor 301, the main storage device 302, the auxiliary storage device 303, the display device 304, the input device 305, and the communication IF 306 are connected via a bus 310.

The processor 301 executes a program read from the auxiliary storage device 303 to the main storage device 302. The main storage device 302 is a memory such as a ROM and a RAM. The auxiliary storage device 303 is an HDD, a memory card, or the like.

The display device 304 displays a state and the like of the KM 20. The input device 305 receives an input from the user. Note that the KM 20 may not include the display device 304 and the input device 305.

The communication IF 306 is an interface for connection to the KM 20, the QKD module 30, the application 40, and the like. When the KM 20 does not include the display device 304 and the input device 305, for example, a display function and an input function of an external terminal connected via the communication IF 306 may be used.

The program executed by the KM 20 and the QKD module 30 is stored, in a file in an installable format or an executable format, in a computer-readable storage medium such as a CD-ROM, a memory card, a CD-R, and a digital versatile disc (DVD), and is supplied as a computer program product.

In addition, the program executed by the KM 20 and the QKD module 30 may be stored on a computer connected to a network such as the Internet and supplied by being downloaded via the network.

In addition, the program executed by the KM 20 and the QKD module 30 may be supplied via a network such as the Internet without being downloaded.

In addition, the program executed by the KM 20 and the QKD module 30 may be supplied by being incorporated in a ROM or the like in advance.

The program executed by the KM 20 (20-2) has a module configuration including functions that can be achieved by the program among the functional configurations of the KM 20 (20-2) described above. The processor 301 reads the program from the storage medium such as the auxiliary storage device 303 and executes the program, whereby the function achieved by the program is loaded to the main storage device 302. That is, the function achieved by the program is generated on the main storage device 302.

Note that some or all of the functions of the KM 20 (20-2) may be achieved by hardware such as an integrated circuit (IC). The IC is, for example, a processor that executes dedicated processing.

In addition, in a case where each function is achieved by using a plurality of processors, each processor may achieve one of the functions or may achieve two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management device comprising:
one or more hardware processors configured to function as:
a determination unit configured to determine a type of request data requested by a request message transmitted from an application that performs encrypted data communication;
a generation unit configured to generate a response message including at least one of a random number and an encryption key shared by quantum key distribution (QKD) via a communication network according to the type of the request data; and
a supply unit configured to supply the response message to the application, wherein
the request message includes a parameter designating at least one of the encryption key and the random number as the type of the request data.

2. The key management device according to claim 1, wherein
the communication network includes at least one of a QKD network that shares a first encryption key and a QKD link that shares a second encryption key, and
the generation unit generates a response message including at least one of the first encryption key shared via the QKD network, the second encryption key shared via the QKD link, and a random number according to a type of the request data.

3. The key management device according to claim 1, wherein
the key management device is connected to a QKD module that is one of devices included in the communication network and
a random number generation module that generates the random number.

4. The key management device according to claim 1, wherein the request message further includes a parameter designating a number of pieces of request data and a parameter designating a size of the request data, and the generation unit generates a response message including the request data having a size and the number designated by the request message.

5. The key management device according to claim 1, wherein
the request message includes at least one of a method parameter designating an encryption method used by the application, a communication destination parameter designating a communication destination of the application, and a size parameter designating a data size, and
the generation unit generates a response message including at least one of an encryption key and a random number according to the method parameter in a case where the method parameter is included in the request message, generates a response message including at least one of an encryption key and a random number according to the communication destination parameter in a case where the communication destination parameter is included in the request message, and generates a response message including at least one of an encryption key used for an encryption process of data having a size designated by the size parameter and a random number used for an encryption process of data having a size designated by the size parameter in a case where the size parameter is included in the request message.

6. The key management device according to claim 1, wherein
the generation unit generates the response message by describing the response message using a message format of a same format in a case where a type of data supplied in response to a request is an encryption key, in a case where a type of data supplied in response to a request is a random number, and in a case where types of data supplied in response to a request are both the encryption key and the random number.

7. The key management device according to claim 1, wherein
when the request data is an encryption key, the determination unit determines whether an accumulation amount of encryption keys in the key management device is smaller than a first threshold value,
the one or more hardware processors of the key management device further function as:
a conversion unit configured to convert a random number into an encryption key when the accumulation amount of the encryption keys is smaller than the first threshold value, and
a communication unit configured to encrypt a converted encryption key indicating an encryption key converted from the random number using an encryption key shared by the QKD and transmit the encrypted converted encryption key to a device connected to an application on a reception side of the encrypted data communication, and
the generation unit generates a response message including the converted encryption key.

8. The key management device according to claim 7, wherein
when the request data is the random number, the determination unit determines whether an accumulation amount of random numbers in the key management device is smaller than a second threshold value,
the conversion unit converts an encryption key into a random number in a case where the accumulation amount of the random numbers is smaller than the second threshold value,
the communication unit transmits communication for making a notification of non-use or deletion of the encryption key, that is converted into the random number, to a device sharing the encryption key converted into the random number, and
the generation unit generates a response message including a converted random number indicating a random number converted from an encryption key.

9. A quantum cryptography communication system comprising:
an encrypted data communication network in which a plurality of applications performs encrypted data communication;
a communication network in which a plurality of quantum key distribution (QKD) modules shares an encryption key by QKD; and
a plurality of key management devices connected to the plurality of QKD modules, wherein
the key management device comprises:
one or more hardware processors configured to function as:
a determination unit configured to determine a type of request data requested by a request message transmitted from an application,
a generation unit configured to generate a response message including at least one of the encryption key and a random number according to the type of the request data, and
a supply unit configured to supply the response message to the application, wherein
the request message includes a parameter designating at least one of the encryption key and the random number as the type of the request data.

10. A computer program product having a non-transitory computer readable medium including programmed instructions stored therein, wherein the instructions, when executed by a computer, cause the computer to function as:
a determination unit configured to determine a type of request data requested by a request message transmitted from an application that performs encrypted data communication;
a generation unit configured to generate a response message including at least one of a random number and an encryption key shared by quantum key distribution (QKD) via a communication network according to the type of the request data; and
a supply unit configured to supply the response message to the application, wherein
the request message includes a parameter designating at least one of the encryption key and the random number as the type of the request data.

* * * * *